United States Patent
Naruse et al.

(10) Patent No.: US 6,312,168 B1
(45) Date of Patent: Nov. 6, 2001

(54) CAMERA

(75) Inventors: Mutsumi Naruse; Toshihiko Izaki, both of Asaka; Hotaka Takeuchi, Tokyo; Masao Nakamori, Tokyo; Yuuichi Ozawa, Tokyo, all of (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/357,155

(22) Filed: Jul. 19, 1999

(30) Foreign Application Priority Data

Jul. 17, 1998 (JP) .................................................. 10-218698
Jul. 24, 1998 (JP) .................................................. 10-223764

(51) Int. Cl.$^7$ .................................................. G03B 17/04
(52) U.S. Cl. ........................................... 396/349; 396/448

(58) Field of Search ..................................... 396/348, 349, 396/350, 448

(56) References Cited

U.S. PATENT DOCUMENTS

| | | | |
|---|---|---|---|
| 4,843,411 | * | 6/1989 | Wakabayashi et al. ............... 396/349 |
| 5,602,607 | * | 2/1997 | Kato et al. ........................... 396/349 |
| 5,761,556 | * | 6/1998 | Ichino .................................. 396/448 |
| 5,764,937 | * | 6/1998 | Machida ............................... 396/349 |

FOREIGN PATENT DOCUMENTS 7-49515   2/1995  (JP) .

* cited by examiner

Primary Examiner—David M. Gray
(74) Attorney, Agent, or Firm—Young & Thompson

(57) ABSTRACT

There is disclosed a camera in which two lens covers are enabled by a spring force of an open and close spring in a direction that the two lens covers are closed.

9 Claims, 13 Drawing Sheets

CAMERA

BACKGROUND OF THE INVENTION

1. Field of the Invention

The present invention relates to a camera having a lens barrel in which a lens cover is automatically opened and closed in accordance with extension and collapse of the lens barrel.

2. Description of the Prior Art

Hitherto, there is known a camera in which an electric motor is driven so that when the camera is not used, an image taking lens is accommodated in a main frame of the camera, and when the camera is used, the image taking lens is extended from the main frame of the camera. Of such a type of camera, there is widely known a camera in which a lens cover is disposed in front of an image taking lens, and the lens cover is automatically opened and closed in accordance with a switching between accommodation and extension of the image taking lens. An example of such a camera is proposed in Japanese Patent Laid Open Gazette Hei. 7-49515.

According to a camera proposed in Japanese Patent Laid Open Gazette Hei. 7-49515, a lens cover is enabled by a spring force to be opened, and when an image taking lens is accommodated in the main frame of the camera, the lens cover is forcibly closed against the spring force. Generally, as compared with a term during which a camera is used, a term during which the camera is not used is overpoweringly longer. Consequently, in the camera proposed in Japanese Patent Laid Open Gazette Hei. 7-49515, a term during which the lens cover is closed against the spring is very long. For this reason, a load is applied for a long time to the spring enabling the lens cover. This raises sometimes a problem as to durability.

Further, according to a camera proposed in Japanese Patent Laid Open Gazette Hei. 7-49515, since a lens cover is enabled by a spring force to be opened, also in the event that an image taking lens is accommodated in the main frame of the camera and the lens cover is closed, a force to always open the lens cover is applied to the lens cover. Accordingly, for example, in an arrangement wherein a lens cover is divided into two pieces, in the event that components constituting a switching mechanism for the lens cover are wrong in production precision even a little bit, this causes a gap between joint surfaces of two pieces of the lens cover. Thus, there is such a defect that the gap may give the impression that it is uncomfortable in appearance. On the other hand, in order to avoid such a defect, it is considered that the production precision of components is improved, or alternatively the switching mechanism for the lens cover is provided with a mechanism for preventing an occurrence of the gap between two pieces of the lens cover. However, this involves a problem that the cost is increased.

It often happens that when the lens cover is closed, a user intends to forcibly open two pieces of the lens cover out of mere curiosity. As mentioned above, since the lens cover is enabled by a spring force to be opened, at the time when the lens cover is closed, a force against the enabling force of the spring is effected on the lens cover. Consequently, in the event that a user intends to forcibly open two pieces of the lens cover, there is the fear that the lens cover is destroyed. In order to avoid such a fear, there is a need to prepare additional components for buffering an external force applied to the lens cover. Also, this involves a problem that the cost is increased.

The camera proposed in Japanese Patent Laid Open Gazette Hei. 7-49515 incorporates thereinto a zoom lens having a two-stage lens barrel collapse structure. According to such a camera, in a lens barrel, there are provided a lens cover enabled by a spring force to be opened and a lens cover switching member for performing open and close of the lens cover. Further, according to such a camera, in a main frame of the camera, there is provided a lens cover switching affecting member which affects the lens cover switching member in such a manner that when the lens barrel is extended, the lens cover is opened, and when the lens barrel is collapsed, the lens cover is closed. In the state that the lens barrel is collapsed to be accommodated, the lens cover switching member and the lens cover switching affecting member are engaged with one another, so that the lens cover is closed against the spring. On the other hand, when the lens barrel is extended, an engagement of the lens cover switching member with the lens cover switching affecting member is removed, so that a force against the spring is released and the lens cover is opened.

Generally, a two-stage collapsible mount type of lens barrel is of a cylindrical structure in view of maintaining a precision and a high density structure. And on the other hand, a picture is of a rectangular configuration. If the camera proposed in Japanese Patent Laid Open Gazette Hei. 7-49515 is constructed under the conditions as mentioned above, there will occur restrictions in an arrangement position of the lens cover switching affecting member in the lens barrel, and in an arrangement position of the lens cover switching member. This brings about a problem that a camera is restricted in degree of freedom of design.

SUMMARY OF THE INVENTION

In view of the foregoing, it is an object of the present invention to provide a camera capable of contributing to an enhancement of durability of a spring enabling a lens cover, and in addition contributing to reduction of the cost.

It is another object of the present invention to provide a camera which is wide in degree of freedom of design.

To achieve the above-mentioned objects, the present invention provides a first camera comprising:

a moving barrel incorporating therein an image taking lens, said moving barrel offering a predetermined extension state and a predetermined collapse state in accordance with movements forward and backward with respect to a direction of an optical axis, respectively;

at least one lens cover disposed in front of the image taking lens in said moving barrel, said lens cover covering a front of the image taking lens on an openable basis; and a lens cover switching mechanism having a spring enabling the lens cover in a direction to be closed and an effecting member working in such a manner that when said moving barrel is in the collapse state, an affect is released so that said lens cover covers a front of the image taking lens in accordance with an enabling force of the spring, and as said moving barrel is translated into the extension state, the lens cover is withdrawn from the front of the image taking lens against the enabling force of the spring.

The lens cover switching mechanism has a spring enabling the lens cover in a direction to be closed. The effecting member of the lens cover switching mechanism works in such a manner that when the moving barrel is in the state of the collapse, the enabling effect is released so that the lens cover covers the front of the image taking lens in accordance with an enabling force of the spring, and as the moving barrel is translated into the state of the extension, the lens cover is withdrawn from the front of the image taking lens against the enabling force of the spring. That is, according to the first camera of the present invention, contrary to the conventional camera, when the camera is used, the lens cover is opened against the enabling force of the spring, and when the camera is not used, the lens cover is closed in accordance with the enabling force of the spring. As mentioned above, generally, as compared with a term during which a camera is used, a term during which the camera is not used is overpoweringly longer. According to the camera of the present invention, during a term in which the camera is not used, the lens cover is closed in accordance with the enabling force of the spring. Thus, it is prevented that a load is applied to a spring for a long time. And it is possible to improve a durability of a spring.

Further, as mentioned above, according to the first camera of the present invention, the lens cover covers the front of the image taking lens in accordance with the enabling force of the spring. Therefore, for example, in the event that the lens cover of the camera is constructed in the form of a two-dividing scheme, a mutually approaching force works between two pieces of lens cover. Consequently, an especial device for suppressing a gap between the two pieces of lens cover, as in the conventional camera, is not required, and thereby reducing the cost.

Furthermore, according to the first camera of the Present invention, the lens cover covers the front of the image taking lens in accordance with the enabling force of the spring. Thus, when the lens cover covers the front of the image taking lens, even if a user applies an external force to the lens cover with intention to open the lens cover, there is no possibility to damage the lens cover switching mechanism. Therefore, there is no need to provide parts for a damage prevention. And also it is possible to reduce the cost.

In the first camera of the present invention as mentioned above, it is preferable that said moving barrel is translated in the direction of the optical axis between the extension state and the collapse state, and said camera further comprises a straight guide member for guiding a translation of said moving barrel in the direction of the optical axis, said straight guide member serving as said effecting member.

The straight guide member serves as said effecting member. This feature may avoid the necessity for providing a dedicated-effecting member for switching the lens cover. Thus, it is possible to reduce the number of parts and also to reduce the cost.

Further, in the first camera of the present invention as mentioned above, it is preferable that said camera further comprises:

an electric motor for generating a driving force to move said moving barrel in the direction of the optical axis;

a driving ring adapted for rotatably moving on the optical axis of the image taking lens upon receipt of the driving force from said electric motor; and a cam mechanism for converting a rotational motion of said driving ring into a translational motion of said moving barrel, wherein said cam mechanism repeatedly reciprocates said moving barrel between the extension state and the collapse state in accordance with a rotation of said electric motor in a same direction.

By the use of the cam mechanism which repeatedly reciprocates said moving barrel between the extension state and the collapse state in accordance with a rotation of said electric motor in a same direction, it is possible to provide, for example, such a control that extension and collapse of the moving barrel are controlled through the forward rotation of the electric motor, and an operation of another mechanism such as a film feed and the like is performed through the reverse rotation of the electric motor. In other words, it is possible to use a single electric motor on a common basis as a driving source for different two mechanisms, and thereby reducing the number of parts.

To achieve the above-mentioned objects, the present invention provides a second camera comprising:

a moving barrel assembly which is extended forward an optical axis with respect to a main frame of the camera and is collapsed backward the optical axis;

a collapsible barrel assembly for supporting an image taking lens, said collapsible barrel assembly being arranged within said moving barrel assembly and being subjected to such a control that when said moving barrel assembly is extended forward, said collapsible barrel assembly is further extended forward with respect to said moving barrel assembly, and when said moving barrel assembly is collapsed backward, said collapsible barrel assembly is collapsed backward with respect to said moving barrel assembly; and at least one lens cover disposed in front of the image taking lens in said collapsible barrel assembly, said lens cover covering a front of the image taking lens on an openable basis, wherein said collapsible barrel assembly has a lens cover switching member for performing open and close of the lens cover, and said moving barrel assembly has a lens cover switching effecting member working in such a manner that the lens cover opens as said collapsible barrel assembly is extended, and the lens cover closes as said collapsible barrel assembly is collapsed.

Here, the term "moving barrel assembly" implies the moving barrel, and the associated various members which move in a direction of the optical axis together with the moving barrel in accordance with the extension and the collapse of the moving barrel, the associated various members being controlled in a movement in a direction of the optical axis with respect to the moving barrel. Likely, the term "collapsible barrel assembly" implies the collapsible barrel, and the associated various members which move in a direction of the optical axis together with the collapsible barrel in accordance with the extension and the collapse of the collapsible barrel, the associated various members being controlled in a movement in a direction of the optical axis with respect to the collapsible barrel. It is noted that while the image taking lens and the lens cover are also members which move in a direction of the optical axis in accordance with the extension and the collapse of the collapsible barrel, they are considered as different members from the collapsible barrel assembly.

According to the second camera of the present invention, the lens cover switching effecting member is provided on the moving barrel assembly, but not the main frame. Thus, there is no need to prepare the lens cover switching effecting member on the main frame. Therefore, a degree of freedom in arrangement positions for parts to be disposed on the main frame broadens, and thus a degree of freedom in design of a camera broadens.

In the second camera of the present invention as mentioned above, it is preferable that said lens cover switching member is always engaged with said lens cover switching effecting member in collapse positions and extension positions of said moving barrel assembly and said collapsible barrel assembly, and overall positions of the halfway positions between the collapse positions and extension positions.

In the event that the lens cover switching member is always engaged with said lens cover switching effecting member, it is possible to more stably and reliably open and close the lens cover as compared with a case where the lens cover switching member is not always engaged with said lens cover switching effecting member.

In the second camera of the present invention as mentioned above, it is preferable that said moving barrel assembly has a moving barrel for performing an extension and a collapse while rotating around the optical axis, and a straight key-ring for causing said collapsible barrel assembly to be extended and collapsed involving no rotation in accordance with the extension and the collapse of said moving barrel, said straight key-ring being provided within said moving barrel, and said straight key-ring serves as said lens cover switching effecting member.

In this case, it is preferable that said lens cover switching member rotates around the optical axis, and said straight key-ring has a groove structure extending in the direction of the optical axis, and being engaged with said lens cover switching member, said groove structure controlling a position of the rotational movement of said lens cover switching member in such a manner that the position is different between a case where said collapse barrel assembly is extended and a case where said collapse barrel assembly is collapsed, and said groove structure having such a shape that an engaging position with said lens cover switching member is formed in a circumference direction with in form of two stages and a halfway of the two stages is coupled by a taper.

In the event that the straight key-ring serves as said lens cover switching effecting member, there is no need to prepare a dedicated space for an arrangement of the lens cover switching effecting member, and also there is no need to prepare the associated parts. Thus, it is possible to contribute to saving a space and reducing the cost. In order that the straight key-ring serves as said lens cover switching effecting member, it is possible to adopt an structure that said lens cover switching member rotates around the optical axis, and said straight key-ring has a groove structure extending in the direction of the optical axis, and being engaged with said lens cover switching member, said groove structure having such a shape that an engaging position with said lens cover switching member is formed in a circumference direction with in form of two stages and a halfway of the two stages is coupled by a taper.

DETAILED DESCRIPTION OF PREFERRED EMBODIMENTS

Embodiments of the present invention will be described with reference to the accompanying drawings.

Figure 1:
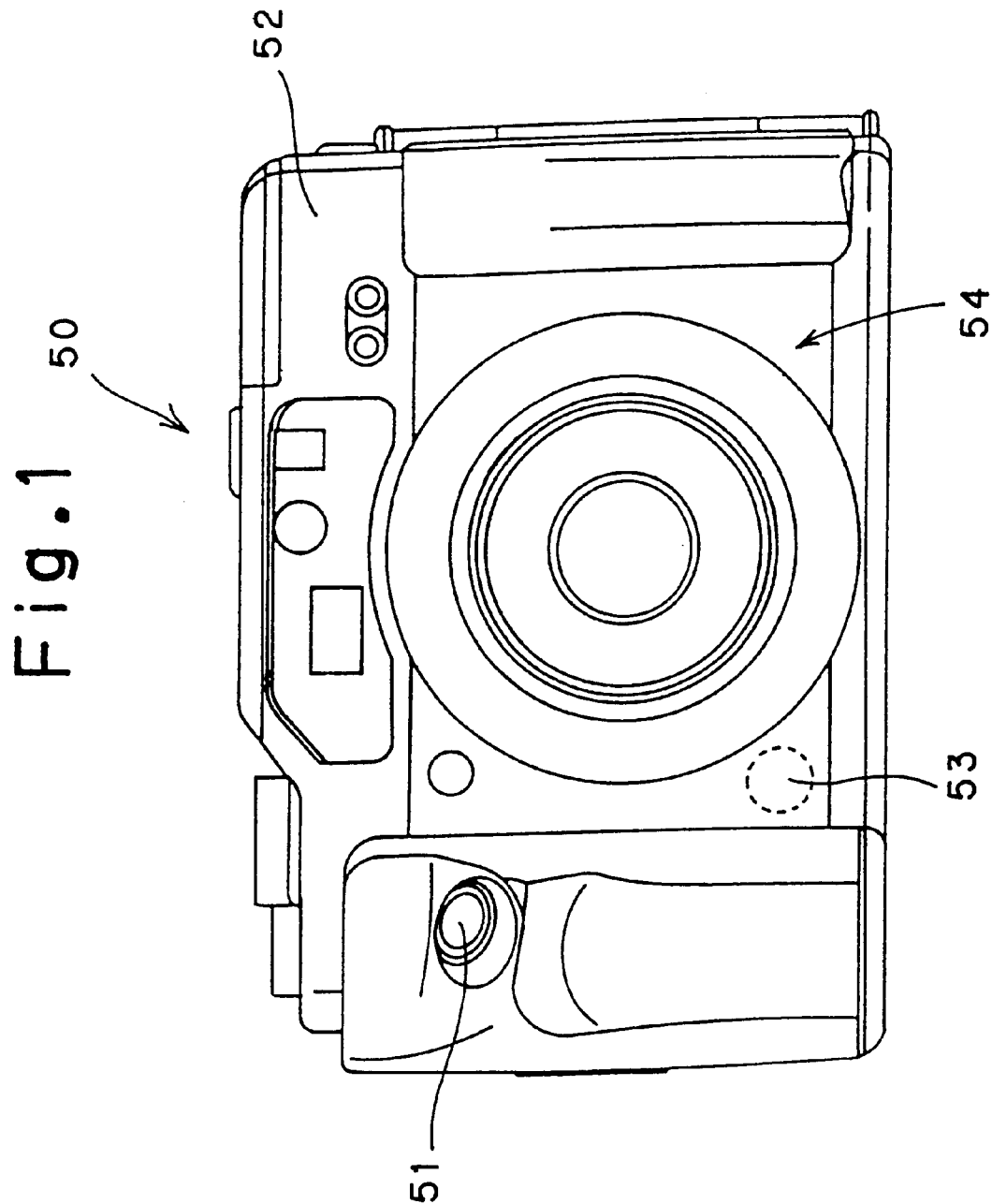
FIG. 1 is a front view of a camera according to a first embodiment of the present invention.
Figure 2:
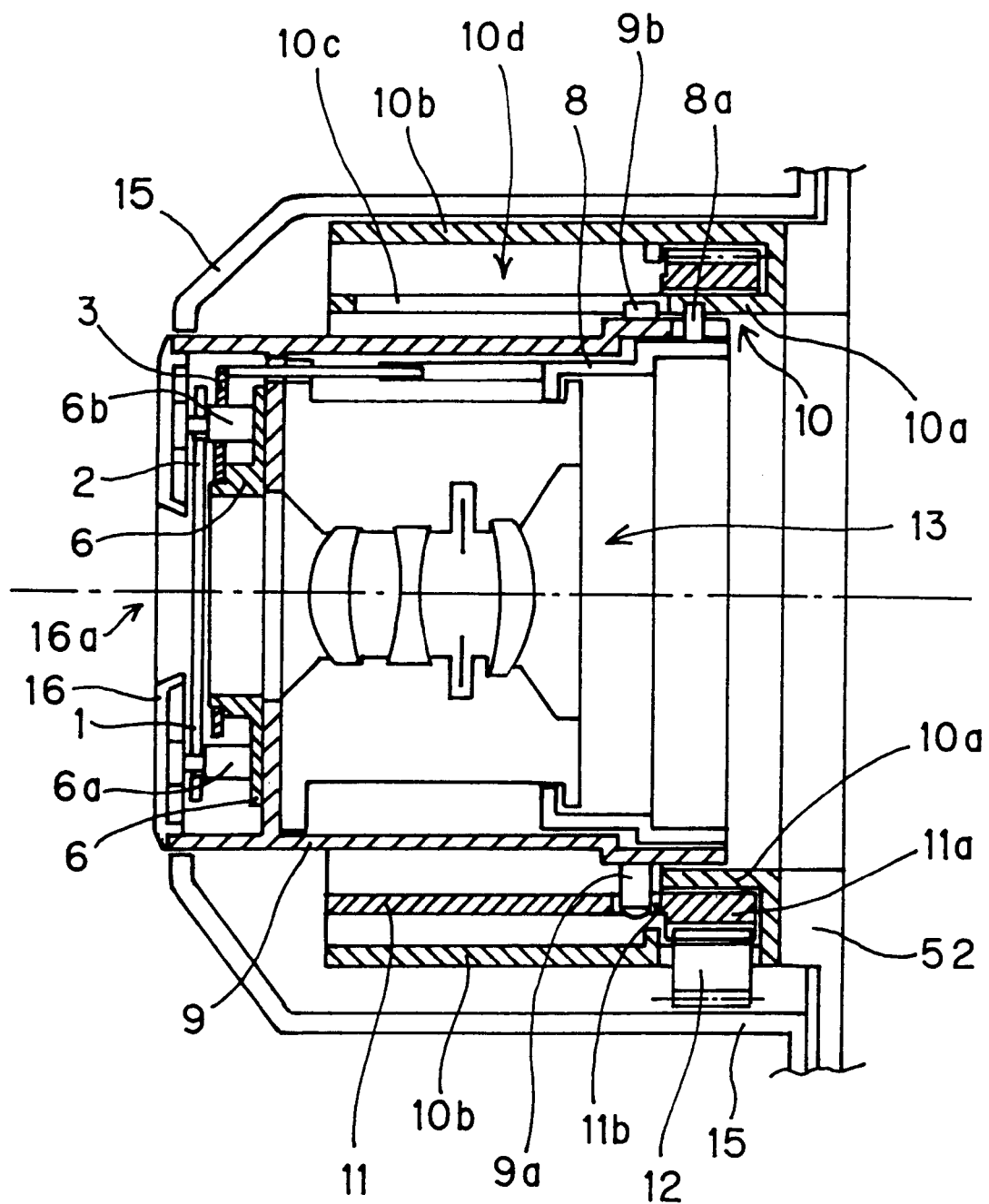
FIG. 2 is a longitudinal sectional view of a lens barrel, which is included in the camera according to the first embodiment, regarding an optical axis direction wherein a straight barrel is in a collapsed state.
Figure 3:
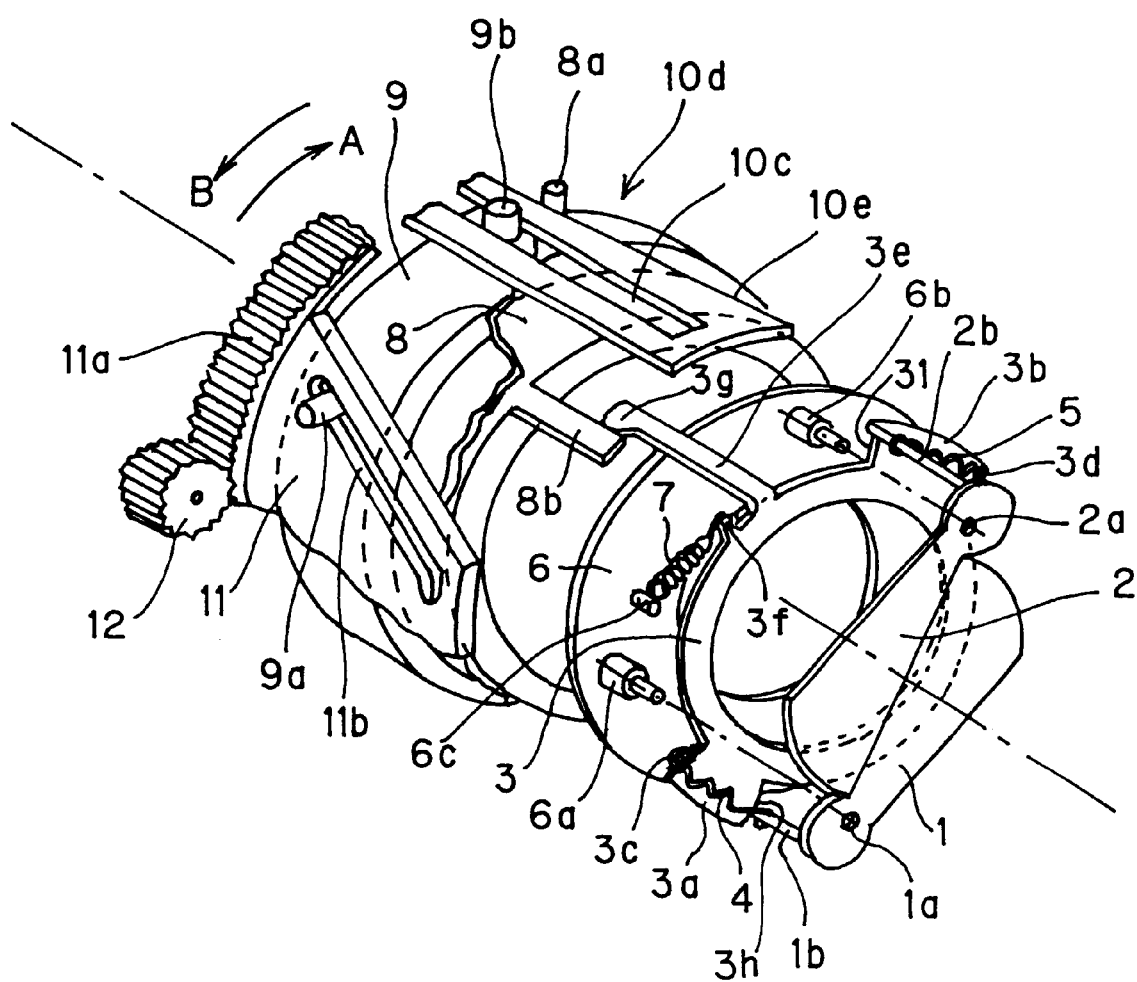
FIG. 3 is a perspective view of main parts of the lens barrel shown in FIG. 2.

FIG. 1 is a front view of a camera according to a first embodiment of the present invention. FIG. 2 is a longitudinal sectional view of a lens barrel, which is included in the camera according to the first embodiment, regarding an optical axis direction wherein a straight barrel is in a collapsed state. FIG. 3 is a perspective view of main parts of the lens barrel shown in FIG. 2. In FIG. 3, a fixed barrel, a driving ring and a straight barrel are shown in the form of a partially cutaway view.

As shown in FIG. 1, a camera 50 comprises a main frame 52 having a shutter button 51 and so on. A lens barrel 54 is mounted in front of the main frame 52. The main frame 52 incorporates thereinto an electric motor 53 for driving of lens extension and collapse of the lens barrel.

As shown in FIG. 2, the lens barrel 54 is provided with a fixed barrel 10 which is fixed on the main frame 52. The fixed barrel 10 comprises an inner barrel 10a and an outer barrel 10b surrounding the inner barrel 10a. The inner barrel 10a guides a straight barrel 9 (the movement barrel referred to in the present invention), which will be described later, directly in a direction of an optical axis. As shown in FIG. 3, the inner barrel 10a is provided with a guide plate 10d on which a straight guide groove 10c extending in a direction of an optical axis. The guide plate 10d is formed in such a manner that one end 10e of the guide plate 10d extends at a slant with respect to a direction of an optical axis, so that a width of the front of the optical axis is wider than that of the back of the optical axis. As seen from FIG. 2, a driving ring 11 is inserted between the inner barrel 10a and the outer barrel 10b of the fixed barrel 10. The driving ring 11 rotatably moves on the optical axis, and is inserted between the inner barrel 10a and the outer barrel 10b in a state that the driving ring 11 is inhibited from being moved in the direction of the optical axis. On the driving ring 11, there is formed a cam groove 11b (cf. FIG. 3) extending at a slant with respect to the direction of the optical axis. On the periphery of the rear end of the driving ring 11, there is formed a driving ring gear 11a which is engaged with a driving gear 12. The driving gear 12 is coupled via a gear train (not illustrated) and the like with the electric motor 53 (cf. FIG. 1) disposed within the main frame 52. When a driving force of the electric motor 53 is transmitted via the gear train and the like to the driving gear 12, the driving gear 12 rotates so that the driving ring 11 rotatably moves on an optical axis of a lens shutter set 13 incorporated into the straight barrel 9. Here, when the electric motor 53 rotates forward, the driving ring 11 rotatably moves in a direction of an arrow A (cf. FIG. 3), and when the electric motor 53 rotates backward, the driving ring 11 rotatably moves in a direction of an arrow B (cf. FIG. 3). As shown in FIG. 2, the straight barrel 9 enters the fixed barrel 10. On the rear end of the straight barrel 9, there are provided a cam pin 9a and a straight guide pin 9b. The cam pin 9a enters the cam groove 11b of the driving ring 11, and the straight guide pin 9b enters the straight guide groove 10c of the fixed barrel 10. The straight barrel 9 is stopped from being rotated by means of the straight guide pin 9b entering the straight guide groove 10c of the fixed barrel 10. Since the cam pin 9a enters the cam groove 11b of the driving ring 11, when the driving ring 11 rotatably moves, the rotational motion is converted into the translational motion. At that time, when the driving ring 11 rotatably moves in a direction of the arrow A (cf. FIG. 3), the straight barrel 9 is translated forward with respect to the optical axis to be extended to a predetermined position. And, when the driving ring 11 rotatably moves in a direction of the arrow B (cf. FIG. 3), the straight barrel 9 is translated backward with respect to the optical axis to be collapsed into the fixed barrel 10. In FIGS. 1–3, the straight barrel 9 is shown in the state that it is collapsed into the fixed barrel 10, and the fixed barrel 10 and the straight barrel 9 are covered by a lens barrel cover 15.

While FIGS. 2 and 3 show only a set of pair of the cam groove 11b of the driving ring 11 and the cam pin 9a penetrating the cam groove 11b, there is provided, at the symmetrical position with respect to the peripheral direction of the optical axis, an additional set of pair of the cam groove and the cam pin, which is not illustrated. Provision of two sets of pair of the cam groove and the cam pin at the symmetrical positions with respect to the peripheral direction of the optical axis makes it possible to smoothly translate the straight barrel 9 in the direction of the optical axis. It is of course acceptable that only one set of pair of the cam groove and the cam pin is prepared.

The camera according to the present embodiment is provided with a lens cover switching mechanism having a spring enabling lens covers 1 and 2 (which will be described later) in a direction to be closed and an effecting member working in such a manner that when the straight barrel 9 is in the state of the collapse, the enabling effect is released so that the lens covers 1 and 2 cover the front of the lens shutter set 13 in accordance with an enabling force of the spring, and as the straight barrel 9 is translated into the state of the extension, the lens covers 1 and 2 is withdrawn from the front of the lens shutter set 13 against the enabling force of the spring. There will be described the lens cover switching mechanism more in details hereinafter.

On the front of the straight barrel 9, there is mounted a lens name plate 16 having an aperture 16a in its center. Inside the straight barrel 9, as shown in FIG. 3, there is disposed a switching drive ring 8 for opening and closing the lens covers 1 and 2. The switching drive ring 8 moves forward and backward according as the straight barrel 9 moves forward and backward. On the rear of the switching drive ring 8, there is provided a sliding pin 8a. on the front of the switching drive ring 8, there is provided a sliding bar 8b. The sliding pin 8a is in contact with the side 10e of the guide plate 10d of the fixed barrel 10 (cf. FIG. 2). Thus, when the switching drive ring 8 moves forward and backward, the sliding pin 8a slides on the side 10e of the guide plate 10d of the fixed barrel 10. The side 10e contacting with the sliding pin 8a is formed at a slant with respect to a direction of an optical axis. Hence, the switching drive ring 8 rotatably moves on the optical axis according as the switching drive ring 8 moves forward and backward. In other words, the switching drive ring 8 moves forward and backward while the switching drive ring 8 rotatably moves. In this manner, the side 10e of the guide plate 10d causes the switching drive ring 8 to rotatably move on the optical axis.

Inside the straight barrel 9, there is mounted a substrate 6 on which cover spindles 6a and 6b are arranged. The cover spindles 6a and 6b are engaged with switching shaft support holes 1a and 2a of the lens covers 1 and 2, respectively. Thus, the lens covers 1 and 2 are supported by the cover spindles 6a and 6b, respectively. In FIG. 3, the lens covers 1 and 2 are separated from the cover spindles 6a and 6b.

A rotational ring 3 is disposed between the substrate 6 and two lens covers 1 and 2. On the periphery of the rotational ring 3, there are provided two sector projections 3a and 3b. On the sides of the sector projections 3a and 3b, there are provided spring hanger segments 3c and 3d. Control springs 4 and 5 are bridged between the spring hanger segments 3c and 3d and switching spring hanger shafts 1b and 2b of the lens covers 1 and 2, respectively. The switching spring hanger shafts 1b and 2b of the lens covers 1 and 2 are urged, by the control springs 4 and 5, to ends 3h and 3i of the sector projections 3a and 3b, which are opposite to the ends of the spring hanger segments 3c and 3d, respectively. Further, on the periphery of the rotational ring 3, there are provided an engagement bar 3e extending backward the optical axis and a spring hanger segment 3f. A switching spring 7 is bridged between the spring hanger segment 3f and a spring hanger shaft 6c. The switching spring 7 causes the rotational ring 3 to be enabled by a spring force in a direction such that a sliding projection 3g provided on the tip of the engagement bar 3e is in contact with the sliding bar 8b of the switching drive ring 8 by a pressure, so that the two lens covers 1 and 2 are enabled by a spring force in a direction that they are closed.

Figure 4:
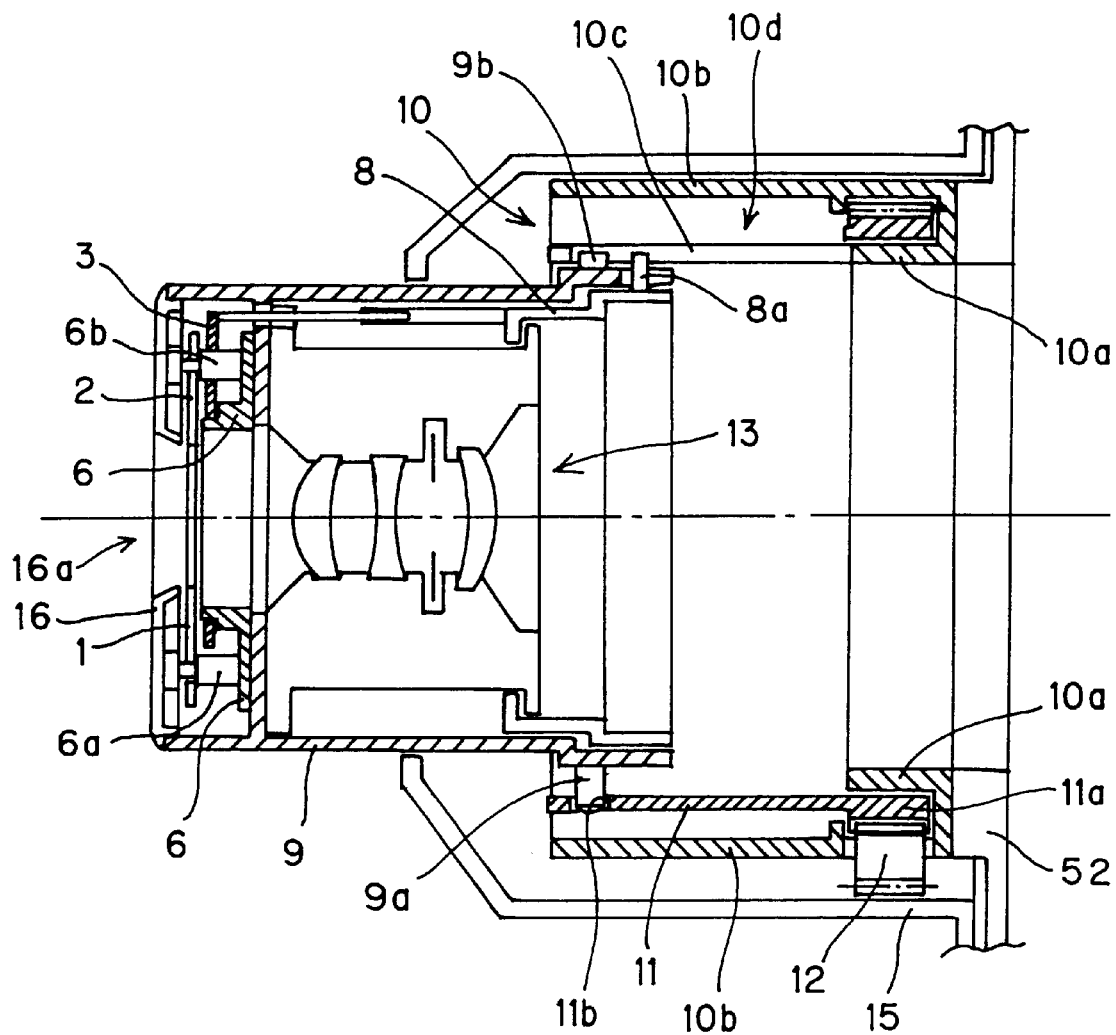
FIG. 4 is a longitudinal sectional view of a lens barrel, in which a straight barrel is extended so that the lens barrel is opened, regarding an optical axis direction.
Figure 5:
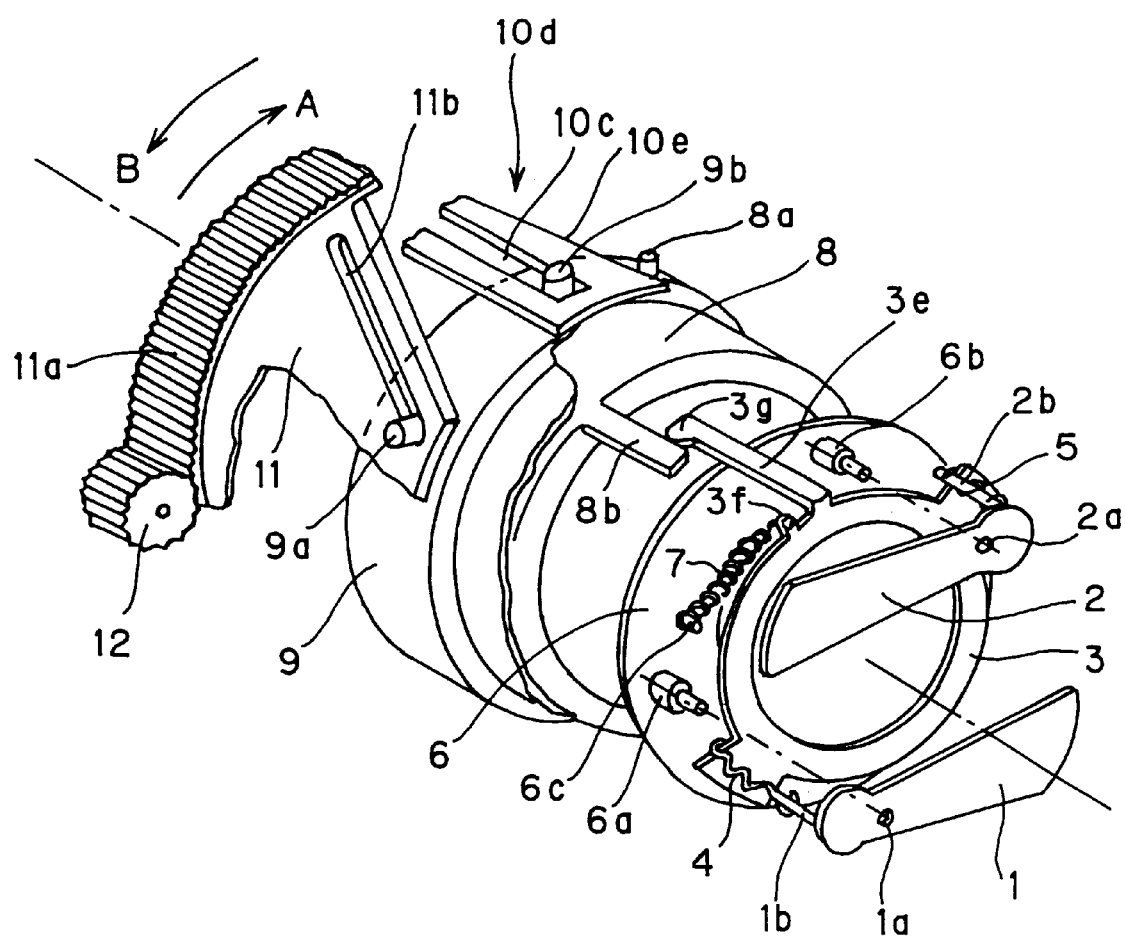
FIG. 5 is a perspective view of main parts of the lens barrel shown in FIG. 4.

FIG. 4 is a longitudinal sectional view of a lens barrel, in which a straight barrel is extended so that the lens barrel is opened, regarding an optical axis direction. FIG. 5 is a perspective view of main parts of the lens barrel shown in FIG. 4. In FIG. 5, a fixed barrel, a driving ring and a straight barrel are shown in the form of a partially cutaway view.

In the state that the straight barrel 9 is collapsed so that the lens covers 1 and 2 are closed, as shown in FIGS. 1–3, when the electric motor 53 disposed in the main frame 52 of the camera forward rotates, a driving force of the electric motor 53 is transferred to the driving gear 12 engaged with the driving ring gear 11a of the driving ring 11, so that the driving gear 12 rotates in a direction of an arrow A (cf. FIG. 3). A rotation of the driving gear 12 in a direction of an arrow A causes the straight barrel 9 to be extended forward with respect to the direction of the optical axis, as shown in FIG. 4, so that the switching drive ring 8 within the straight barrel 9 moves forward with respect to the direction of the optical axis. When the switching drive ring 8 moves forward with respect to the direction of the optical axis, as shown in FIG. 5, the sliding pin 8a of the switching drive ring 8 slides on the side 10e of the guide plate 10d on the inner barrel (cf.

FIG. 4) of the fixed barrel 10 and moves forward. As mentioned above, the side 10e is formed at a slant with respect to the direction of the optical axis. Accordingly, the switching drive ring 8 rotatably moves in the direction of the arrow A and moves forward. When the switching drive ring 8 rotatably moves in the direction of the arrow A, the sliding bar 8b of the switching drive ring 8 urges the sliding projection 3g of the rotational ring 3 in the direction of the arrow A, so that the rotational ring 3 rotatably moves in the direction of the arrow A against an enabling force of the switching spring 7. At that time, the lens covers 1 and 2 rotatably move on the cover spindles 6a and 6b in the direction that the lens covers 1 and 2 is withdrawn from the front of the lens shutter set 13 (cf. FIG. 4), respectively, so that the lens covers 1 and 2 open as shown in FIG. 5. In other words, when the straight barrel 9 is extended, the lens covers 1 and 2 open against an enabling force of the switching spring 7. Incidentally, in FIG. 5, the lens covers 1 and 2 are separated from the cover spindles 6a and 6b.

On the other hand, in order to collapse the extended straight barrel 9, it is effective that the electric motor 53 is reversely rotated. When the electric motor 53 is reversely rotated, the driving ring 11 rotates in a direction of an arrow B so that the extended straight barrel 9 collapses (moves backward with respect to a direction of the optical axis). At that time, the switching drive ring 8 within the straight barrel 9 rotatably moves in a direction of an arrow B opposite to that in the event that the straight barrel 9 is extended. Consequently, the rotational ring 3 rotatably moves in the direction of the arrow B, and the lens covers 1 and 2 rotatably moves in accordance with an enabling force in a direction that they covers the front of the lens shutter set 13, so that the lens covers 1 and 2 is closed, as shown in FIG. 3.

According to the camera thus constructed, the inner barrel 10a having the guide plate 10d has both the function of guiding of a translation of the straight barrel 9 in the direction of the optical axis and the function of causing the switching drive ring 8 to rotatably move around the optical axis so as to affect the open and close of the lens covers 1 and 2. This feature makes it possible to contribute to a reduction of the number of parts of the camera.

The camera is provided with the switching spring 7 which enables the lens covers 1 and 2 in a direction that they are closed. The lens covers 1 and 2 is controlled in such a way that when the straight barrel 9 is collapsed in the fixed barrel 10, as shown in FIG. 3, the lens covers 1 and 2 cover the front of the lens shutter set 13 in accordance with an enabling force of the switching spring 7, and when the straight barrel 9 is extended, as shown in FIG. 5, the lens covers 1 and 2 are withdrawn from the front of the lens shutter set 13 against the enabling force of the switching spring 7. In other words, when the camera is used, the lens covers 1 and 2 are opened against the enabling force of the switching spring 7, and when the camera is not used, the lens covers 1 and 2 are closed in accordance with the enabling force of the switching spring 7. In this manner, when the camera is not used, the lens covers 1 and 2 are closed in accordance with the enabling force of the switching spring 7. This feature makes it possible to improve a durability of the switching spring 7, since it is prevented that a load is applied to the switching spring 7 for a long time.

On the other hand, the two lens covers 1 and 2 cover the front of the lens shutter set 13 in accordance with the enabling force of the switching spring 7. That is, when the lens covers 1 and 2 cover the front of the lens shutter set 13, the lens covers 1 and 2 are enabled by a spring force in a direction that they approach one another. Therefore, there is no need to make an attempt of an improvement of a precision on the manufacture of the switching drive ring 8 affecting the open and close of the lens covers 1 and 2, for the purpose of preventing a gap between the lens covers 1 and 2 from occurring, and further there is no need to prepare dedicated parts for preventing a gap between the lens covers 1 and 2 from occurring in addition to the switching drive ring 8. This feature makes it possible to reduce the cost of the camera.

As mentioned above, the lens covers 1 and 2 cover the front of the lens shutter set 13 in accordance with the enabling force of the switching spring 7. Thus, when the lens covers 1 and 2 cover the front of the lens shutter set 13, even if a user intends to open the lens covers 1 and 2 and applies the external force to the lens covers 1 and 2, there is no fear that parts such as the lens covers 1 and 2 are damaged. Accordingly, there is no need to prepare new parts for preventing damages on the camera. This feature makes it possible to reduce the cost of the camera.

Next, there will be explained a camera according to the second embodiment of the present invention. In the explanation of the camera according to the second embodiment, only different points from the camera according to the first embodiment will be described referring to FIGS. 1–5 as the need arises.

A different point between the camera according to the first embodiment and the camera according to the second embodiment is only a point that a driving ring of the camera according to the second embodiment is provided with a cam groove which is different in the shape from the cam groove 11b formed on the driving ring 11 of the camera according to the first embodiment.

Figure 6:
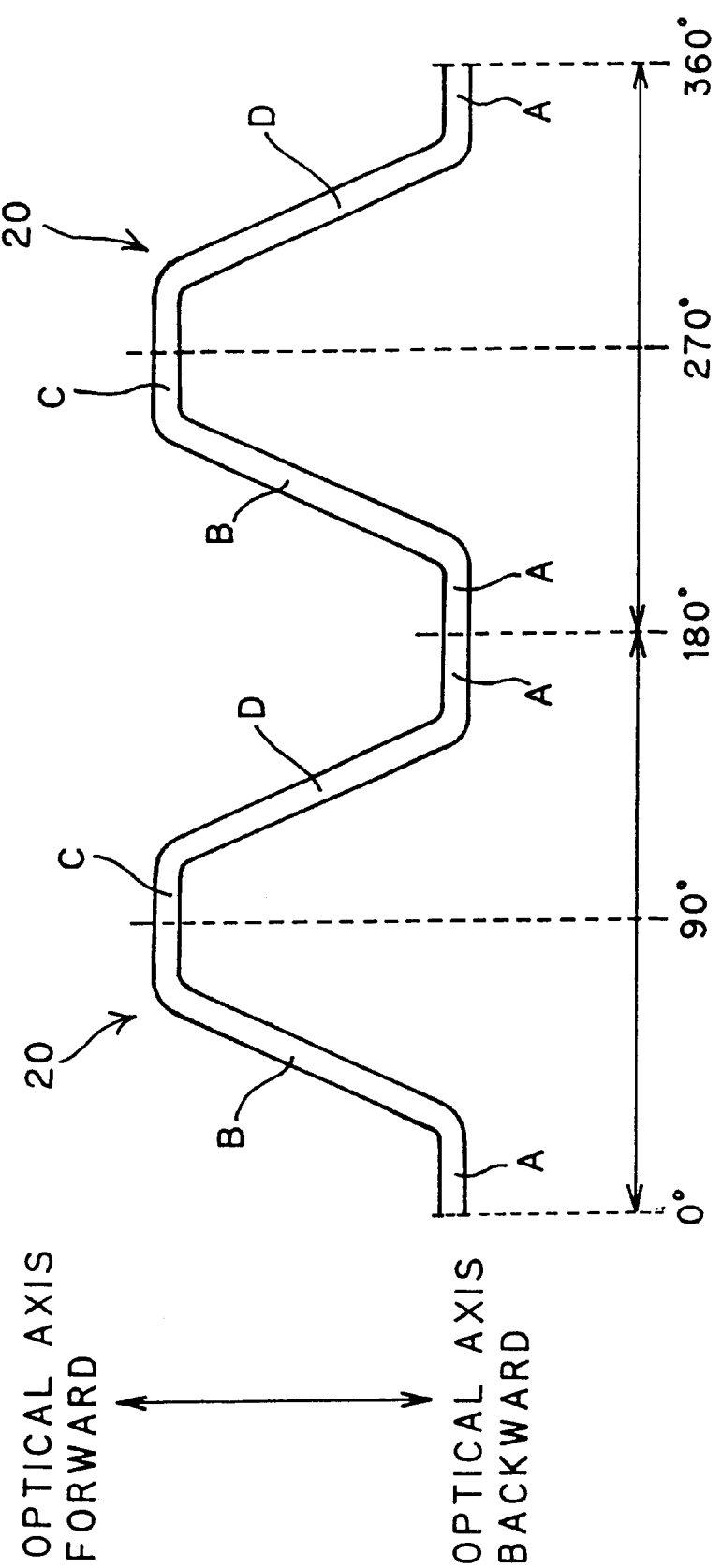
FIG. 6 is an illustration showing cam grooves formed on a driving ring of a camera according to a second embodiment of the present invention, wherein the driving ring is developed in a circumference direction.

FIG. 6 is an illustration showing cam grooves formed on a driving ring of a camera according to the second embodiment of the present invention, wherein the driving ring is developed in a circumference direction.

On the driving ring of the camera according to the second embodiment, there are formed two cam grooves 20 each having a V-like shape, which a cam pin 9a (cf. FIG. 3) of the straight barrel 9 penetrates, in such a manner that the cam grooves 20 form a loop free from a break in a circumference direction of the driving ring. When the cam pin 9a of the straight barrel 9 is located at a position A, for example, the left end of the cam groove 20, the straight barrel 9 is collapsed into the fixed barrel 10 (cf. FIG. 2). When the electric motor 53 in the main frame 52 is rotated in a one direction, the driving ring rotatably moves, so that the cam pin 9a of the straight barrel 9 travels along a portion B of the cam groove 20 to a portion C. Thus, the straight barrel 9 is extended. When the cam pin 9a of the straight barrel 9 reaches the portion C, the extension of the straight barrel 9 is completed. When the electric motor 53 is rotated further in the same direction, the cam pin 9a of the straight barrel 9 travels along a portion D of the cam groove 20 to a portion A. Thus, the straight barrel 9 is collapsed. When the cam pin 9a of the straight barrel 9 reaches the portion A, the collapse of the straight barrel 9 is completed. When the electric motor 53 is rotated furthermore in the same direction, the extension and the collapse of the straight barrel 9 are sequentially performed, and finally the process returns to the position A of the left end shown in FIG. 6. That is, a provision of the driving ring having the cam grooves 20 shown in FIG. 6 makes it possible to sequentially perform the extension and the collapse of the straight barrel 9, through only rotating the electric motor 53 in the same direction, whenever the driving ring rotates 90°. Thus, it is possible, for example, to perform the extension and the collapse of the straight barrel 9 by the forward rotation of the electric motor 53 in the main frame 52, and to perform an operation of another mechanism such as a film feed and the like by the backward rotation of the electric motor 53. This structure permits a single electric motor to be used on a common basis as a driving source for different two mechanisms. This feature makes it possible to contribute to a reduction of the number of parts of the camera.

Figure 7:
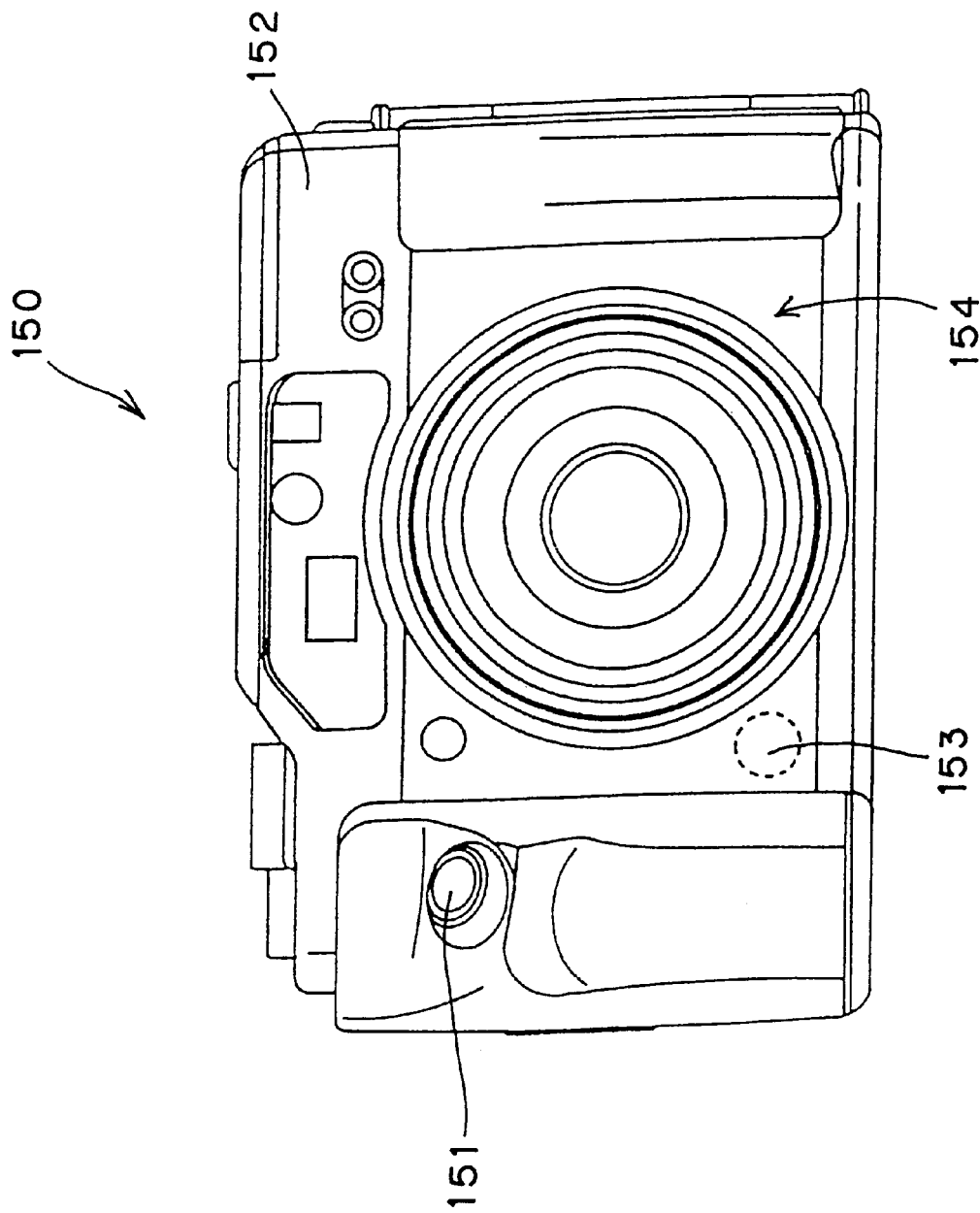
FIG. 7 is a front view of a camera according to a third embodiment of the present invention.
Figure 8:
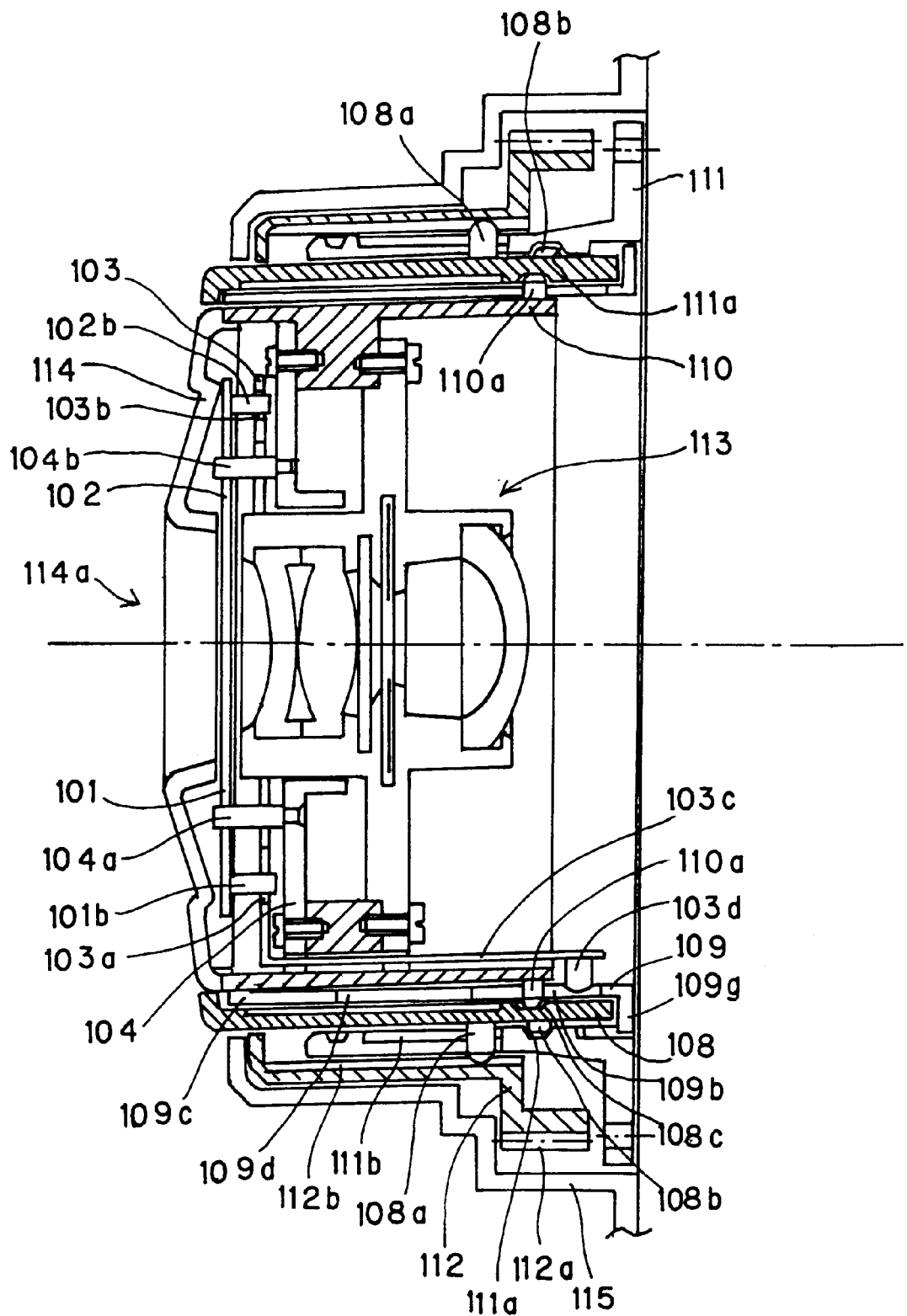
FIG. 8 is a longitudinal sectional view of a lens barrel, which is included in the camera shown in FIG. 7, regarding an optical axis direction wherein a moving barrel and a straight collapsible barrel are in a collapsed state.
Figure 9:
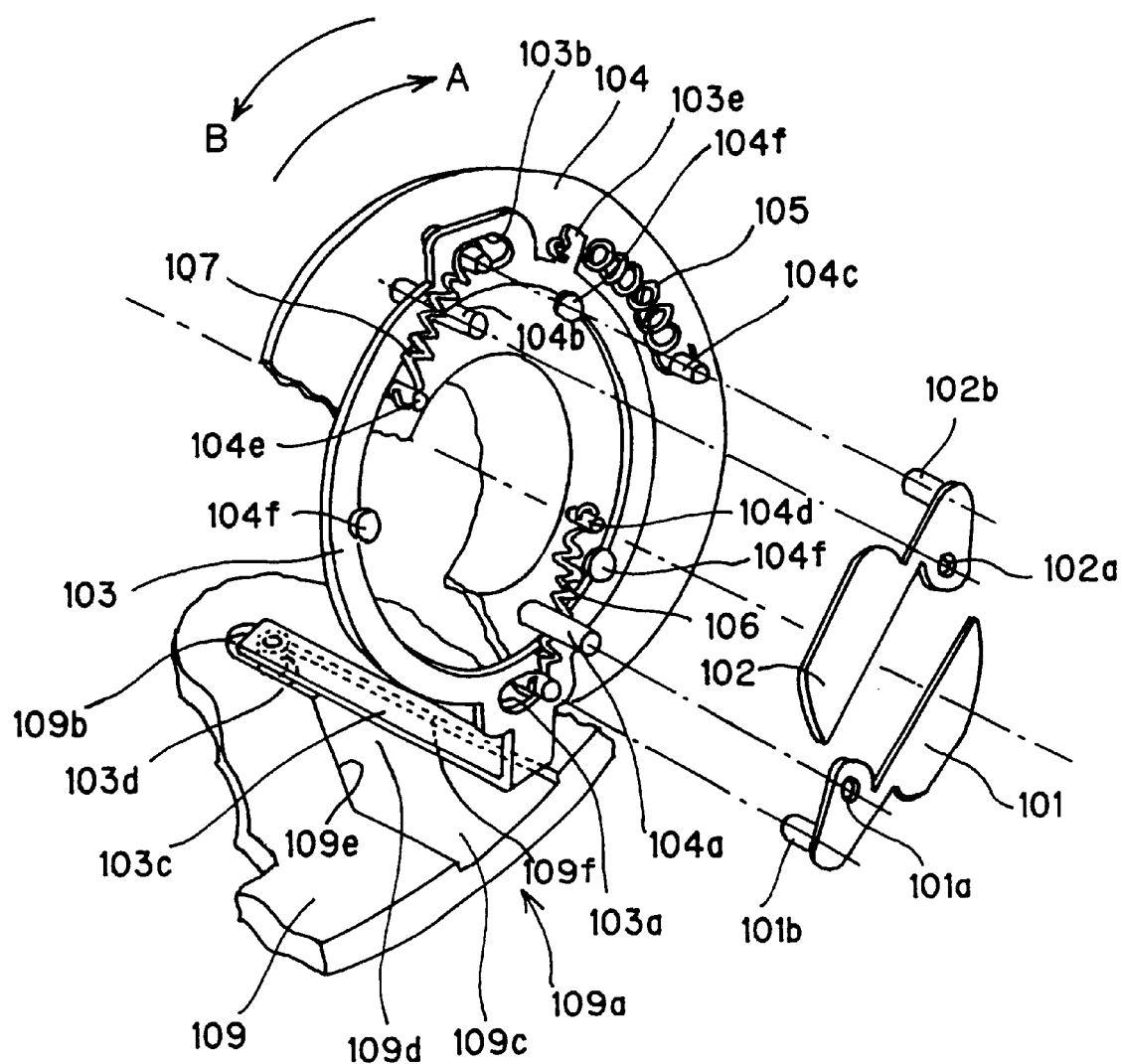
FIG. 9 is a perspective view of main parts of the lens barrel shown in FIGS. 7 and 8.

FIG. 7 is a front view of a camera according to a third embodiment of the present invention. FIG. 8 is a longitudinal sectional view of a lens barrel, which is included in the camera shown in FIG. 7, regarding an optical axis direction wherein a moving barrel and a straight collapsible barrel are in a collapsed state. FIG. 9 is a perspective view of main parts of the lens barrel shown in FIGS. 7 and 8. In FIG. 9, a lens cover switching base and a straight key-ring are shown in the form of a partially cutaway view.

As shown in FIG. 7, a camera 150 comprises a main frame 152 having a shutter button 151 and so on. A lens barrel 154 is mounted in front of the main frame 152. The main frame 152 incorporates thereinto an electric motor 153 for driving of lens extension and collapse of the lens barrel.

As shown in FIG. 8, the lens barrel 154 is provided with a straight collapse barrel 110, a moving barrel 108 and a fixed cam barrel 111 which is fixed on the main frame 152 (cf. FIG. 7). On an inner wall of the fixed cam barrel 111 there are formed a helicoid configuration of cam groove 111a into which a cam pin 108b of the moving barrel 108 is inserted, and a key groove 111b into which a straight key 109g of a straight key-ring 109 which will be described later. The lens barrel 154 is further provided with a driving ring 112 which is covered by a barrel cover 115. The driving ring 112 is rotatably mounted on an optical axis at a position surrounding an outer wall of the fixed cam barrel 111, but is not movable in a direction of the optical axis. On the periphery of the rear end of the driving ring 112, there is formed a driving gear 112a to which a driving force of the electric motor 153 (cf. FIG. 7) disposed inside the main frame 152 is transferred. When the driving force of the electric motor 153 is transferred to the driving gear 112a of the driving ring 112, the driving ring 112 rotates on the optical axis. On the inner wall of the driving ring 112, there is formed a driving groove 112b extending in the direction of the optical axis for rotating the moving barrel 108 around the optical axis. The moving barrel 108 is disposed inside the fixed cam barrel 111. On the outer wall of the rear of the moving barrel 108, there are formed a coupling pin 108a which is inserted into the driving groove 112b of the driving ring 112 and a cam pin 108b which is inserted into the cam groove 111a of the fixed cam barrel 111. Thus, the moving barrel 108 is disposed in the fixed cam barrel 111. On the outer wall of the rear of the moving barrel 108 there are provided a coupling pin 108a which is inserted into the driving groove 112b of the driving ring 112 and the cam pin 108b which is inserted into the cam groove 111a of the fixed cam barrel 111. Thus, when a driving force of the electric motor 153 is transferred to the driving gear 112a of the driving ring 112 so that the driving ring 112 rotates on the optical axis, the moving barrel 108 rotates on the optical axis via the coupling pin 108a since the coupling pin 108a of the moving barrel 108 is inserted into the driving groove 112b of the driving ring 112. Here, since the cam pin 108b is inserted into the cam groove 111a of the fixed cam barrel 111, the moving barrel 108 is guided by the cam groove 111a and is traveled in a direction of the optical axis while rotated around the optical axis. When the electric motor 153 forward rotates, the moving barrel 108 is extended forward with respect to a direction of the optical axis. When the electric motor 153 reversely rotates, the moving barrel 108 is collapsed backward with respect to the direction of the optical axis. On an inner wall of the moving barrel 108 there is formed a helicoid configuration of cam groove 108c. The moving barrel 108 is provided with a straight key-ring 109 which is inhibited from being rotated, since a straight key 109g provided on the rear of the straight key-ring 109 is inserted into the key groove 111b of the fixed cam barrel 111. Thus, the straight key-ring 109 may be extended and collapsed without being rotated, in accordance with the extension and the collapse of the moving barrel 108. Inside the straight key-ring 109, there is arranged the straight collapse barrel 110 incorporating therein a lens shutter set 113 in a state that the straight collapse barrel 110 is inhibited from being rotated with respect to the straight key-ring 109. On the periphery of the rear end of the straight collapse barrel 110, there is formed a cam pin 110a which penetrates the straight key-ring 109 and enters the cam groove 108c of the moving barrel 108. Consequently, when the moving barrel 108 is extended forward, the straight collapse barrel 110 is extended further forward with respect to the moving barrel 108, and when the moving barrel 108 is collapsed backward, the straight collapse barrel 110 is collapsed with respect to the moving barrel 108. FIGS. 7–9 show both the moving barrel 108 and the straight collapse barrel 110 in the state that they are collapsed in the fixed cam barrel 111.

On the front of the straight collapse barrel 110, there is mounted a name plate 114 having an aperture 114a in its center. A lens cover switching base 104 is fixed at the position surrounding front half of the lens shutter set 113 inside the lens shutter set 113. The lens cover switching base 104 is provided with, as shown in FIG. 9, three rotatably movable spindles 4f for rotatably and movably supporting a lens cover switching ring 103 on the optical axis. On the lens cover switching base 104, there are provided three spring hanger pins 104c, 104d and 104e. a driving spring 105 is bridges between the spring hanger pin 104c and a spring hanger segment 103e of the lens cover switching ring 103. The lens cover switching ring 103 is enabled by a spring force of the driving spring 105 in a direction of an arrow A. In the front of the lens shutter set 113 (cf. FIG. 8) in the straight collapse barrel 110, there are arranged lens covers 101 and 102 for covering the front of the lens shutter set 113 freely in opening and closing. Rotatably movable shaft holes 101a and 102a of the lens covers 101 and 102 are supported by lens cover spindles 104a and 104b provided on the lens cover switching base 104, respectively. Affecting pins 101b and 102b of the lens covers 101 and 102 penetrate control holes 103a and 103b of the lens cover switching ring 103, respectively. Incidentally, in FIG. 9, the lens covers 101 and 102 are separated from the lens cover spindles 104a and 104b. Lens cover springs 106 and 107 are bridged between the affecting pins 101b and 102b and the spring hanger pins 104d and 104e provided on the lens cover switching base 104. The lens covers 101 and 102 are enabled by a spring force of the lens cover springs 106 and 107 in a direction of closing. The lens cover switching ring 103 is provided with a guide bar 103c extending backward with respect to the optical axis. On one end of the guide bar 103c, there is formed a guide pin 103d. On the inner wall of the straight key-ring 109, there is formed a guide groove 109a extending in the direction of the optical axis, the guide groove 109a being engaged with the guide pin 103d. The guide groove 109a controls a position of the rotational movement of the lens cover switching ring 103 in such a manner that the position is different between a case where the straight collapse barrel 110 is extended and a case where the straight collapse barrel 110 is collapsed. The guide groove 109a has a lens cover close guide member 109b and a lens cover open guide member 109c which are mutually different from one another in width and are coupled with one another halfway by a taper segment 109d. At the time when the straight collapse barrel 110 (cf. FIG. 8) is collapsed, as shown in FIG. 9, the guide pin 103d of the lens cover switching ring 103 is engaged with the lens cover close guide member 109b. When the guide pin 103d is located within the lens cover close guide member 109b, applied to the lens cover switching ring 103 is a force in a direction of an arrow B against a spring force of the driving spring 105, so that the lens covers 101 and 102 are closed in accordance with enabling forces of the lens cover springs 106 and 107.

In this manner, in the state that the moving barrel 108 and the straight collapse barrel 110 are collapsed in the fixed cam barrel 111, the lens covers 101 and 102 are in the closed state.

Figure 10:
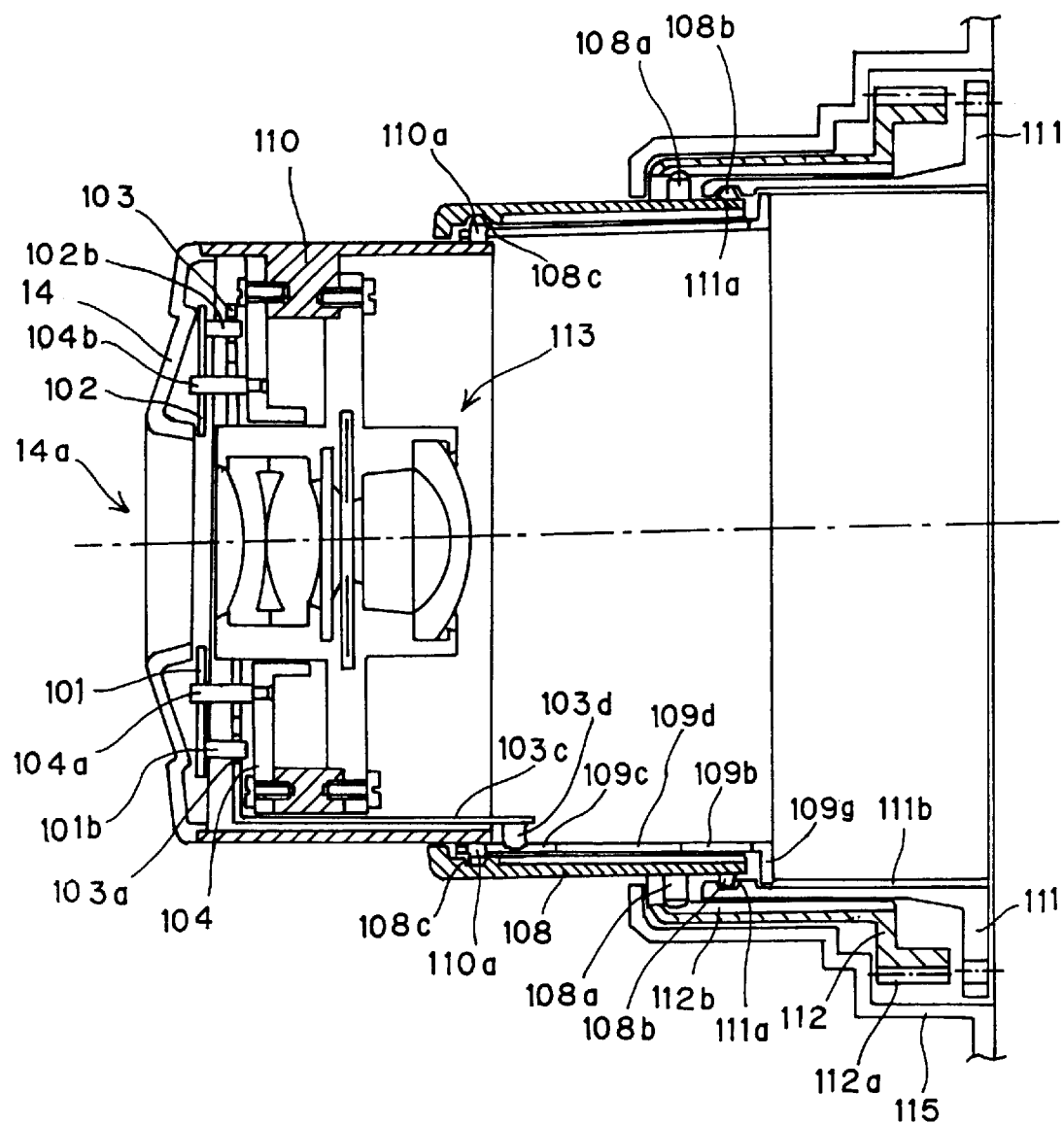
FIG. 10 is a longitudinal sectional view of a lens barrel, which is included in the camera according to the third embodiment of the present invention, regarding an optical axis direction wherein the moving barrel and the straight collapsible barrel are in an extended state.
Figure 11:
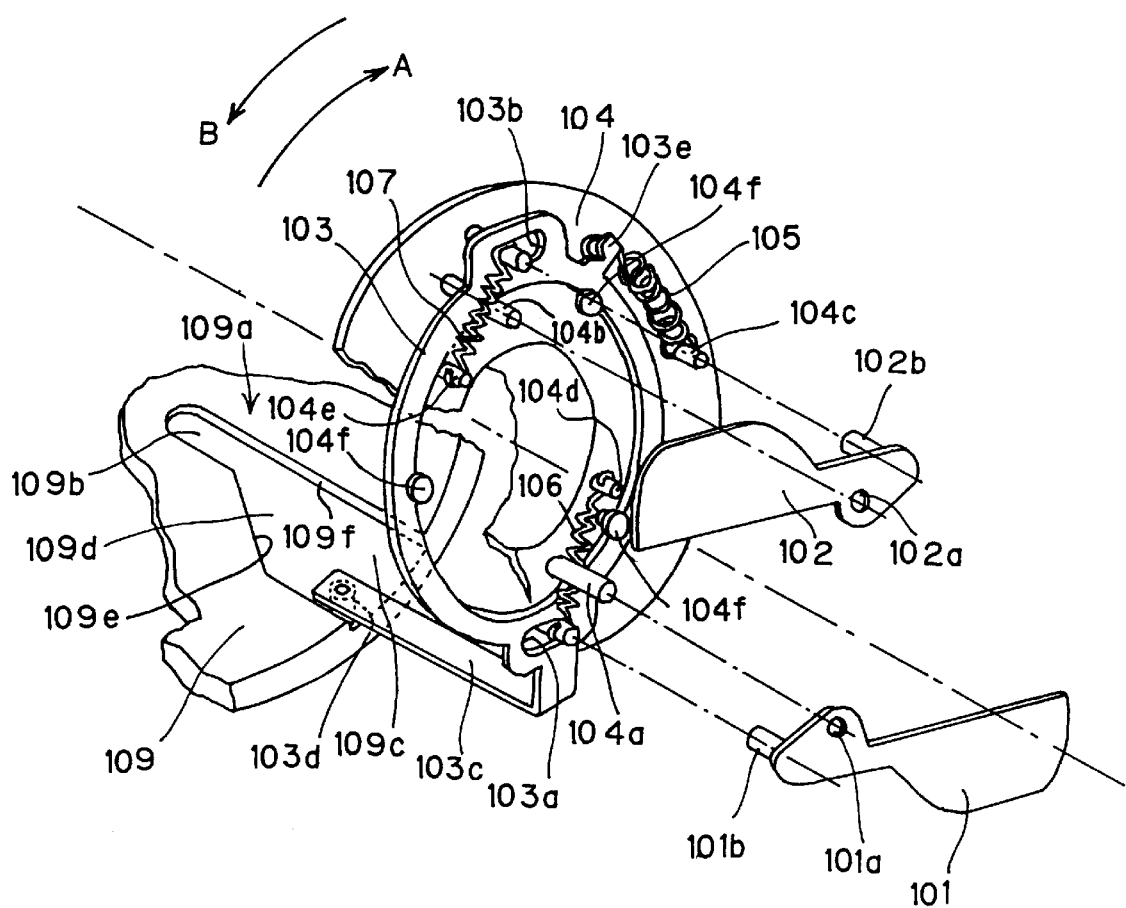
FIG. 11 is a perspective view of main parts of the lens barrel shown in FIG. 10.

FIG. 10 is a longitudinal sectional view of a lens barrel, which is included in the camera according to the third embodiment of the present invention, regarding an optical axis direction wherein the moving barrel and the straight collapsible barrel are in an extended state. FIG. 11 is a perspective view of main parts of the lens barrel shown in FIG. 10. In FIG. 11, a lens cover switching base and a straight key-ring are shown in the form of a partially cutaway view.

As shown in FIG. 8, in the state that the moving barrel 108 and the straight collapse barrel 110 are collapsed, when the electric motor 153 (cf. FIG. 7) forward rotates and a driving force of the electric motor 153 is transferred to the driving gear 112a of the driving ring 112, the driving ring 112 rotates on the optical axis. As mentioned above, the coupling pin 108a of the moving barrel 108 is inserted into the driving groove 112b of the driving ring 112 and the cam pin 108b of the moving barrel 108 is inserted into the cam groove 111a of the fixed cam barrel 111. Thus, when the driving ring 112 rotates, the moving barrel 108 is guided by the cam groove 111a of the fixed cam barrel 111, and as shown in FIG. 10, is extended while rotating on the optical axis. When the moving barrel 108 is extended, the cam pin 110a of the straight collapse barrel 110, which is inserted into the cam groove 108c of the moving barrel 108, is guided by the cam groove 108c so that the straight collapse barrel 110 is extended further forward with respect to the moving barrel 108. The straight collapse barrel 110 is inhibited from being rotated with respect to the straight key-ring 109. Thus, the straight collapse barrel 110 may be extended without being rotated. When the straight collapse barrel 110 is extended from the moving barrel 108, as shown in FIG. 11, the lens cover switching ring 103 in the straight collapse barrel 110 moves forward in a direction of the optical axis with respect to the straight key-ring 109, so that the guide pin 103d formed on the one end of the guide bar 103c is escaped from the lens cover close guide member 109b. By the way, an enabling force of the driving spring 105 is set to be larger than that of two lens cover springs 106 and 107. Consequently, when the guide pin 103d is escaped from the lens cover close guide member 109b and is moved to the taper segment 109d, the guide pin 103d is slid into a stepped side wall surface 109e, of the side wall surfaces 109e and 109f of the guide groove 109a, in accordance with the enabling force of the driving spring 105. At that time, the lens cover switching ring 103 moves forward with respect to a direction of the optical axis while rotatably moving in a direction of an arrow A. When the lens cover switching ring 103 rotatably moves in a direction of an arrow A, the affecting pins 101b and 102b, which are engaged with the control holes 103a and 103b of the lens cover switching ring 103, respectively, cause the lens covers 101 and 102 to rotatably moves against the lens cover springs 106 and 107, so that the lens covers 101 and 102 gradually open. When the lens cover switching ring 103 further moves forward in a direction of the optical axis, and as shown in FIG. 11, the guide pin 103d reaches the lens cover open guide member 109c, the lens cover switching ring 103 stops in its rotational movement. Thus, an extension of the straight collapse barrel 110 is completed, and the opening operation for the lens covers 101 and 102 is terminated.

On the other hand, in order to collapse the extended moving barrel 108 and straight collapse barrel 110, it is effective that the electric motor 153 is reversely rotated. When the electric motor 153 is reversely rotated, an operation opposite to the extension operation for the straight collapse barrel 110 and the moving barrel 108 forward with respect to a direction of the optical axis is affected, so that the straight collapse barrel 110 and the moving barrel 108 move backward with respect to a direction of the optical axis. At that time, the guide pin 103d of the lens cover switching ring 103 reaches the lens cover close guide member 109b from the lens cover open guide member 109c via the taper segment 109d. Thus, the lens cover switching ring 103 rotatably moves in a direction of an arrow B against the driving spring 105, so that the lens covers 101 and 102 are closed (cf. FIG. 9).

According to the camera 150 thus constructed, the straight key-ring 109 arranged in the moving barrel 108 is provided with the guide groove 109a for controlling a position of the rotational movement of the lens cover switching ring 103. Thus, the straight key-ring 109 inhibits the straight collapse barrel 110 from being rotated, and also controls the position of the rotational movement of the lens cover switching ring 103. Accordingly, there is no need to provide in the main frame of the camera a member for controlling the position of the rotational movement of the lens cover switching ring 103, and thus a degree of freedom as to an arrangement position for parts to be arranged in the main frame of the camera is expanded. This feature makes it possible to implement a camera which is wider in a degree of freedom of a design as compared with the conventional camera.

According to the camera of the third embodiment, the guide pin 103d of the lens cover switching ring 103 is always engaged with the guide groove 109a in collapse positions and extension positions of the moving barrel 108 and the straight collapse barrel 110, and overall positions of the halfway positions between the collapse positions and extension positions. This feature makes it possible to more stably and reliably open and close the lens cover.

According to the camera of the third embodiment, as mentioned above, the straight key-ring 109 controls the position of the rotational movement of the lens cover switching ring 103. Accordingly, there is no need to provide on the camera 150 a dedicated member for controlling the position of the rotational movement of the lens cover switching ring 103, and also there is no need to prepare a dedicated space for an arrangement of the associated parts. Thus, it is possible to contribute to saving a space and reducing the cost.

According to the camera of the third embodiment, a width of the guide groove 109a (cf. FIG. 11) is provided in the form of two types. One side wall surface 109e of the guide groove 109a is of a stepped configuration, and another side wall surface 109f of the guide groove 109a is of a straight configuration. By the way, the guide pin 103d of the lens cover switching ring 103 travels between the lens cover close guide member 109b and the lens cover open guide member 109c while sliding on the side wall surface 109e, of the side wall surfaces 109e and 109f of the guide groove 109a, but the configuration of the another side wall surface 109f does not contribute to travelling of the guide pin 103d. Thus, according to the camera of the third embodiment, a width of the guide groove 109a is provided in the form of two types, but it is acceptable that the width of the guide groove 109e is the same width per se, for example, in such a manner that the side wall surface 109f of the guide groove 109a is formed to meet the another side wall surface 109e. In this case, the guide pin 103d travels in accordance with the configuration of the guide groove, and thus it is not always needed that the lens cover switching ring is enabled by a spring force of the driving spring 105.

Further, according to the third embodiment of the present invention, the extension and the collapse of the moving barrel 108 and the straight collapse barrel 110 are performed in such a manner that on the inner walls of the fixed cam barrel 111 and the moving barrel 108 there are formed the helicoid configuration of cam grooves 111a and 108c into which the cam pins 108b and 110a of the moving barrels 108 and the straight collapse barrel 110 are inserted, and the electric motor 153 in the main frame 152 forward and reversely rotates. However, it is acceptable that the extension and the collapse of the lens barrel are performed in such a manner that the cam grooves of the inner walls of the fixed cam barrel 111 and the moving barrel 108 are formed as a V-like character, the cam pins 108b and 110a of the moving barrels 108 and the straight collapse barrel 110 are inserted into the V-like shaped cam grooves, and the electric motor 153 rotates only in the same direction.

Next, there will be described a camera according to the fourth embodiment.

Figure 12:
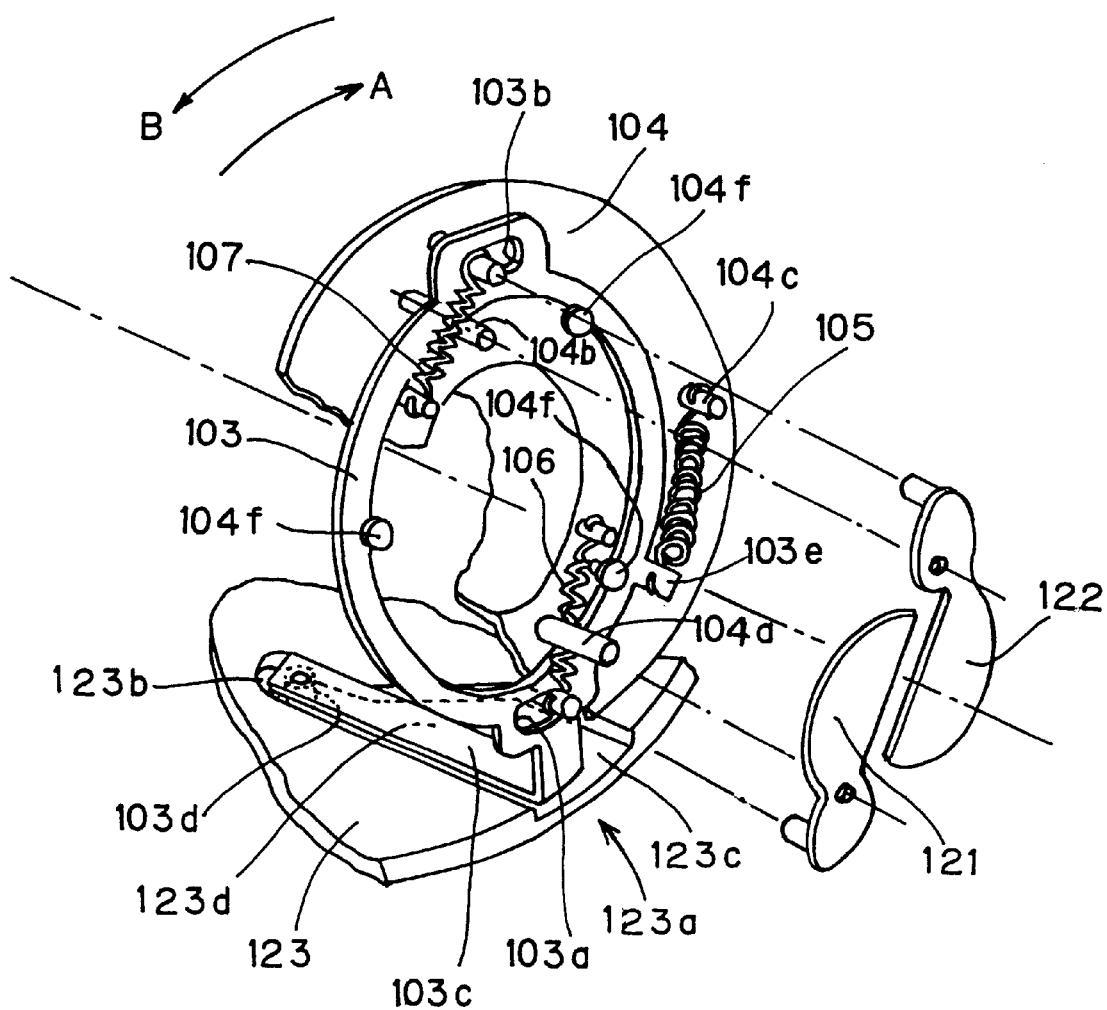
FIG. 12 is a perspective view of main parts of a lens barrel, which is included in a camera according to a fourth embodiment of the present invention, wherein a moving barrel and straight collapsible barrel are in a collapsed state.
Figure 13:
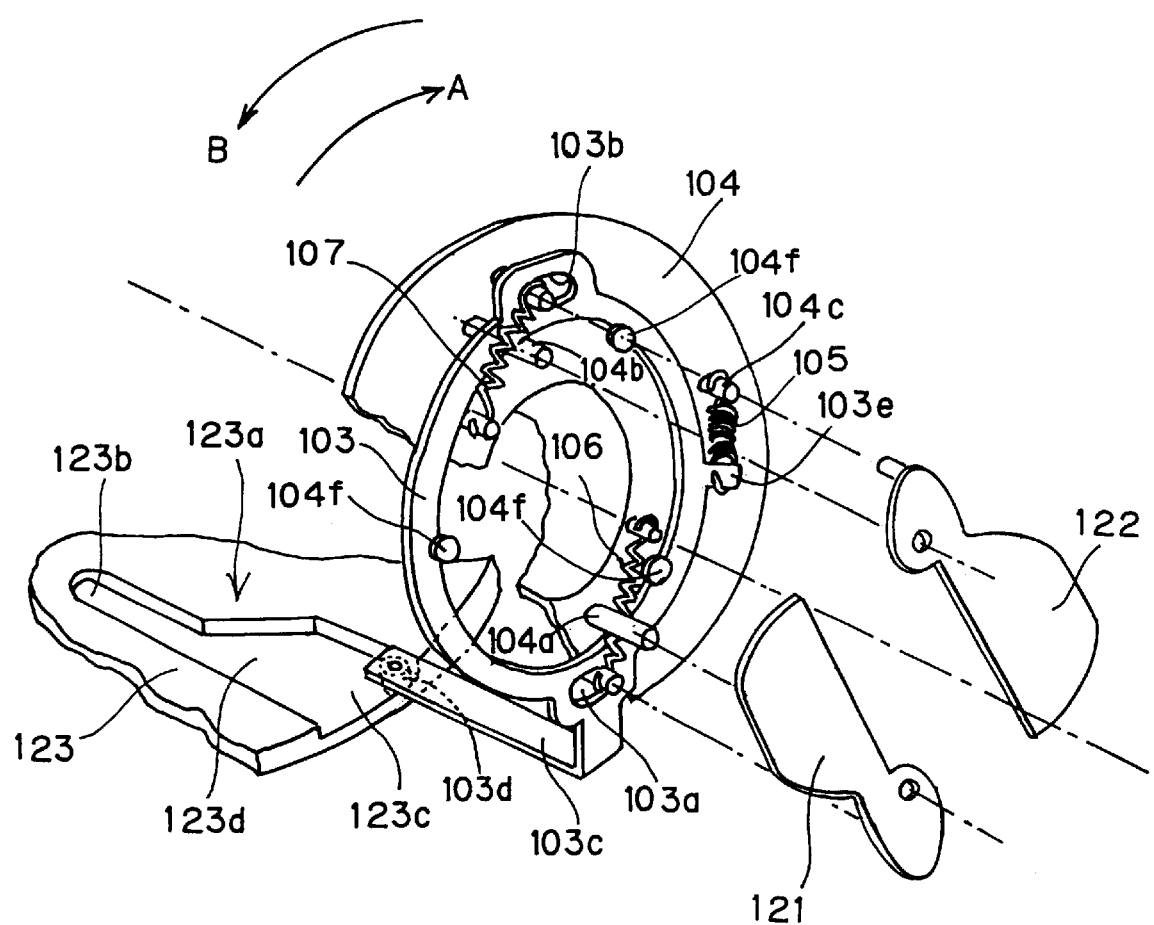
FIG. 13 is a perspective view of main parts of the lens barrel, which is included in the camera according to the fourth embodiment of the present invention, wherein the moving barrel and the straight collapsible barrel are in an extended state.

FIG. 12 is a perspective view of main parts of a lens barrel, which is included in a camera according to a fourth embodiment of the present invention, wherein a moving barrel and a straight collapsible barrel are in a collapsed state. FIG. 13 is a perspective view of main parts of the lens barrel, which is included in the camera according to the fourth embodiment of the present invention, wherein the moving barrel and the straight collapsible barrel are in an extended state.

In the explanation of the camera according to the fourth embodiment, only different points from the camera according to the third embodiment will be described referring to FIGS. 12 and 13, and FIGS. 7–11 as the need arises. The different points are the following three points.

(1) The shapes of the lens covers 121 and 122 of the camera according to the fourth embodiment are formed in a mirror image relation with the shapes of the lens covers 101 and 102 (cf. FIG. 9) of the camera according to the third embodiment. Thus, according to the fourth embodiment, the lens covers 121 and 122 are enabled by spring forces of the lens cover springs 106 and 107 in a direction that they are opened, respectively.

(2) According to the camera of the fourth embodiment, as shown in FIG. 12, the spring hanger segment 103e of the lens cover switching ring 103 is provided rather near the control hole 103a of the two control holes 103a and 103b. The driving spring 105 is mounted between the spring hanger segment 103e and the spring hanger pin 104c of the lens cover switching base 104. The driving spring 105 enables the lens cover switching ring 103 with a spring force in a direction of an arrow B.

(3) According to the camera of the fourth embodiment, a guide groove 123a formed on a straight key-ring 123 is formed on an optical axial symmetry basis with respect to the guide groove 109a (cf. FIG. 11) formed on the straight key-ring 109 of the camera according to the third embodiment.

According to the camera of the fourth embodiment thus constructed, as shown in FIG. 12, when the guide pin 103d of the lens cover switching ring 103 is engaged with a lens cover close guide member 123b, the lens covers 121 and 122 are closed against enabling forces of the lens cover springs 106 and 107. The lens cover close guide member 123b is coupled with a lens cover open guide member 123c by a taper segment 123d. When the lens cover switching ring 103 moves forward, the lens cover switching ring 103 is rotatably translated in a direction of an arrow B, and as shown in FIG. 13, the guide pin 103d enters the lens cover open guide member 123c. Thus, the lens covers 121 and 122 open in accordance with the enabling forces of the lens cover springs 106 and 107, respectively.

In comparison of the third embodiment with the fourth embodiment, according to the third embodiment, the lens covers 101 and 102 are enabled by the lens cover springs 106 and 107 in a direction that they are closed, respectively. On the other hand, according to the fourth embodiment, the lens covers 121 and 122 are enabled by the lens cover springs 106 and 107 in a direction that they are opened, respectively. As seen from the above, in the two-stage collapsible mount type of camera, we don't care about the direction wherein the lens cover is enabled.

Incidentally, in addition to the camera according to the third and fourth embodiments, it is acceptable that a camera of the present invention is arranged in such a manner that the straight key-ring is omitted from the camera according to the third and fourth embodiments so as to provide a rotary collapsible structure in which a straight collapsible barrel is rotated and translated in a direction of the optical axis, and on the inner wall of the moving barrel 108 there is formed in addition to the cam groove 108c a guide groove having a lens cover close guide member, a taper segment and a lens cover open guide member. Further, it is also acceptable that a camera of the present invention is arranged in such a manner that the lens cover consists of a single member but not a two-divided member.

As mentioned above, according to a camera of the present invention, it is possible to improve a durability of a spring enabling a lens cover, and also to reduce the cost of the camera.

Further, according to a camera of the present invention, it is possible to provide a camera which is wide in a degree of freedom in design.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A camera comprising:
   a moving barrel incorporating therein an image taking lens, said moving barrel having a predetermined extended position and a predetermined collapsed position representing forward and backward limits of travel along an optical axis, respectively;

at least one lens cover movably disposed in front of the image taking lens in said moving barrel so that the lens cover can selectively cover and uncover a front of the image taking lens; and a lens cover switching mechanism comprising a rotatable ring disposed in contact with each said lens cover so that rotation of the rotatable ring in a first direction causes the lens cover to cover the image taking lens, and rotation of the rotatable ring in a second direction causes the lens cover to uncover the image taking lens, the lens cover switching mechanism further comprising a spring in direct contact with the rotatable ring and a fixed point in the camera which urges the rotatable ring in the first direction.

2. A camera according to claim 1, wherein said camera further comprises:

an electric motor;

a driving ring drivable by the electric motor to be rotatable about the optical axis of the image taking lens; and a cam mechanism for converting a rotational motion of said driving ring into a movement of said moving barrel along the optical axis, wherein said cam mechanism repeatedly reciprocates said moving barrel between the extended position and the collapsed position in accordance with a rotation of said electric motor in a single direction.

3. The camera of claim 1, wherein each said lens cover comprises a spring hanger shaft extending toward the rotatable ring and arranged to be in contact with the rotatable ring, and the lens cover switching mechanism further comprises a control spring for each said lens cover, said control spring having a first end connected to the rotatable ring.

4. The camera of claim 3, wherein a second end of each said control spring is connected to one said spring hanger shaft, so that each said spring hanger shaft is maintained in contact with the rotatable ring throughout a full range of travel of said lens cover.

5. A camera comprising:

a moving barrel assembly which is adapted to be extended forward along an optical axis with respect to a main frame of the camera and collapsed backward along the optical axis so that the moving barrel rotates about the optical axis as it extends and collapses along the optical axis;

a collapsible barrel assembly supporting an image taking lens, said collapsible barrel assembly being arranged within said moving barrel assembly so that when said moving barrel assembly is extended forward, said collapsible barrel assembly is further extended forward with respect to said moving barrel assembly without rotating about the optical axis, and when said moving barrel assembly is collapsed backward, said collapsible barrel assembly is collapsed backward with respect to said moving barrel assembly without rotating about the optical axis; and at least one movable lens cover disposed in front of the image taking lens in said collapsible barrel assembly, said lens cover covering a front of the image taking lens in a closed position and exposing a front of the image taking lens in an open position, wherein said collapsible barrel assembly comprises a lens cover switching member to move the lens cover between the open and closed positions, and said moving barrel assembly has a lens cover switching effecting member working in such a manner that the lens cover opens as said collapsible barrel assembly is extended, and the lens cover closes as said collapsible barrel assembly is collapsed, wherein said lens cover switching member is a lens cover switching ring in contact with the lens cover switching effecting member, the lens cover switching ring surrounding the optical axis and having a guide bar extending therefrom with a guide pin disposed on the guide bar, and wherein said lens cover switching effecting member is a moving barrel ring arranged within the moving barrel so that the moving barrel ring moves along the optical axis with the moving barrel without rotating about the optical axis with the moving barrel;

wherein said lens cover switching member rotates around the optical axis, and said moving barrel ring has a groove disposed on an interior surface within which the guide pin is disposed so that said groove controls a rotational position of the lens cover switching ring in such a manner that the rotational position of the lens cover switching ring is determined by whether said collapse barrel assembly is extended or said collapse barrel assembly is collapsed.

6. The camera of claim 5, wherein the groove of the moving barrel ring comprises a narrow portion nearest a body of the camera, a wider portion furthest from the camera body, and a taper portion between the wider portion and the narrow portion.

7. The camera of claim 6, wherein when the guide pin is in the narrow portion of the groove, the lens cover is in the closed position, and when the guide pin is in the wider portion of the groove, the lens cover is in the open position.

8. The camera of claim 7, wherein when the guide pin is in the taper portion and the wider portion of the groove, the guide pin is urged toward one edge of the groove.

9. The camera of claim 8, wherein the guide pin is urged by a spring attached to the lens cover switching ring.

* * * * *